US009339707B2

(12) United States Patent
Jeffery et al.

(10) Patent No.: US 9,339,707 B2
(45) Date of Patent: May 17, 2016

(54) USING A MOBILE DEVICE WITH INTEGRATED MOTION SENSING FOR CUSTOMIZED GOLF CLUB FITTING

(71) Applicant: Ai Golf, LLC, Mesa, AZ (US)

(72) Inventors: Mark John Jeffery, Mesa, AZ (US); Robert Sunshin Komorous-King, Berkeley, CA (US)

(73) Assignee: Aquimo, LLC, Mesa, AZ (US)

( * ) Notice: Subject to any disclaimer, the term of this patent is extended or adjusted under 35 U.S.C. 154(b) by 0 days.

(21) Appl. No.: 13/726,603

(22) Filed: Dec. 25, 2012

(65) Prior Publication Data

US 2013/0165246 A1    Jun. 27, 2013

Related U.S. Application Data

(60) Provisional application No. 61/580,534, filed on Dec. 27, 2011.

(51) Int. Cl.
*A63B 59/00* (2015.01)
*A63B 69/36* (2006.01)
(Continued)

(52) U.S. Cl.
CPC ............ *A63B 59/0074* (2013.01); *A63B 60/42* (2015.10); *A63B 69/36* (2013.01);
(Continued)

(58) Field of Classification Search
CPC ........... A63B 69/3632; A63B 59/0074; A63B 24/0003; A63B 60/42; A63B 69/3623; A63B 69/36; A63B 2024/0068; A63B 2220/44; A63B 2071/06; A63B 71/0622; A63B 2220/833; A63B 2220/40; A63B 2220/20; A63B 2225/50; A63B 2225/685; A63B 2220/12; A63B 2220/836; A63B 2220/803; G06F 1/1694
See application file for complete search history.

(56) References Cited

U.S. PATENT DOCUMENTS 5,550,735 A * 8/1996 Slade et al. ................. 700/99
7,789,742 B1   9/2010 Murdock et al.
(Continued)

FOREIGN PATENT DOCUMENTS

JP    2010011926 A2    1/2010
KR    101059258 B1    8/2011
(Continued)

OTHER PUBLICATIONS

Custom Club Fitting. www.taylormadegolfpreowned.com. Online. May 10, 2008. Accessed via the Internet. Accessed Jun. 16, 2014. <URL: https://web.archive.org/web/20081005151158/http://www.taylormadegolfpreowned.com/custom/clubfitting.aspx>.*
(Continued)

*Primary Examiner* — Pierre E Elisca
*Assistant Examiner* — Carl V Larsen
(74) *Attorney, Agent, or Firm* — Morgan Law Offices, PLC

(57) ABSTRACT

One aspect of the disclosure relates to a method of swinging a mobile device to simulate swinging of a golf club in order to evaluate a user's golf swing for customized golf club fitting. In an embodiment, the method can be performed by a processor of the mobile device. In another embodiment, the method can be performed for multiple mobile devices concurrently, the method performed at least in part on a cloud-based server. According to an aspect of the invention, a method comprises swinging a mobile device having motion sensors integrated therein to simulate a golf swing; evaluating the simulated golf swing to determine at least one characteristic of a custom-fitted golf club; and outputting information related to the determined at least one characteristic. In an embodiment, the mobile device is held by a user. In an alternate embodiment, the mobile device is attached to a golf club.

43 Claims, 12 Drawing Sheets

(51) Int. Cl.
  *G06F 1/16* (2006.01)
  *A63B 71/06* (2006.01)
  *A63B 24/00* (2006.01)

(52) U.S. Cl.
  CPC ......... *A63B69/3623* (2013.01); *A63B 69/3632* (2013.01); *G06F 1/1694* (2013.01); *A63B 71/0622* (2013.01); *A63B 2024/0068* (2013.01); *A63B 2071/065* (2013.01); *A63B 2220/12* (2013.01); *A63B 2220/20* (2013.01); *A63B 2220/40* (2013.01); *A63B 2220/44* (2013.01); *A63B 2220/803* (2013.01); *A63B 2220/833* (2013.01); *A63B 2220/836* (2013.01); *A63B 2225/50* (2013.01); *A63B 2225/685* (2013.01)

(56) References Cited

U.S. PATENT DOCUMENTS

| | | | |
|---|---|---|---|
| 7,796,548 B2 | 9/2010 | Lee | |
| 2002/0019763 A1 | 2/2002 | Linden et al. | |
| 2003/0040380 A1* | 2/2003 | Wright et al. | 473/409 |
| 2004/0111333 A1* | 6/2004 | Kang et al. | 705/26 |
| 2006/0063980 A1 | 3/2006 | Hwang et al. | |
| 2007/0010341 A1* | 1/2007 | Miettinen et al. | 473/131 |
| 2008/0319787 A1 | 12/2008 | Stivoric et al. | |
| 2009/0183010 A1 | 7/2009 | Schnell et al. | |
| 2009/0326688 A1* | 12/2009 | Thomas et al. | 700/91 |
| 2010/0304804 A1 | 12/2010 | Spivack | |
| 2011/0082735 A1* | 4/2011 | Kannan et al. | 705/14.23 |
| 2011/0086611 A1* | 4/2011 | Klein et al. | 455/407 |
| 2011/0190061 A1 | 8/2011 | Takeda et al. | |
| 2011/0230986 A1* | 9/2011 | Lafortune et al. | 700/93 |
| 2012/0122574 A1* | 5/2012 | Fitzpatrick et al. | 463/31 |
| 2012/0289354 A1* | 11/2012 | Cottam et al. | 473/223 |
| 2012/0302379 A1* | 11/2012 | Margoles et al. | 473/407 |

FOREIGN PATENT DOCUMENTS

| | | | |
|---|---|---|---|
| KR | 101059258 B1 * | 8/2011 | A63B 69/36 |
| KR | 1010592581 B1 | 8/2011 | |

OTHER PUBLICATIONS

Bibliographic data: WO2012091512 (A3). worldwide.espacenet.com. Online. Accessed via the Internet. Accessed Nov. 3, 2014. <URL: http://worldwide.espacenet.com/publicationDetails/biblio?CC=WO&NR=2012091512A3&KC=A3&FT=D&ND=5&date=20120823&DB=EPODOC&locale=en_EP>.*

Tech Tips and Toys, New iPing Putter App—For iPhone, Jun. 19, 2011 (Retrieved on http://techtipsandtoys.wordpress.com/2011/06/19/new-iping-putter-app-for-iphone.

* cited by examiner

USING A MOBILE DEVICE WITH INTEGRATED MOTION SENSING FOR CUSTOMIZED GOLF CLUB FITTING

CROSS-REFERENCE TO RELATED APPLICATIONS

This application claims the benefit of U.S. Provisional Ser. No. 61/580,534 to Jeffery et al., entitled USING A MOBILE PHONE WITH INTEGRATED MOTION SENSING FOR GOLF SWING EVALUATION AND CUSTOMIZED GOLF CLUB FITTING, filed Dec. 27, 2011, the subject matter of which is incorporated herein by reference. This application is also related to U.S. application Ser. No. 13/659,774 to Jeffery et al., entitled METHOD TO PROVIDE DYNAMIC CUSTOMIZED SPORTS INSTRUCTION RESPONSIVE TO MOTION OF A MOBILE DEVICE, filed Oct. 24, 2012; U.S. patent application Ser. No. 13/269,534 to Jeffery, filed Oct. 7, 2011, and entitled "METHOD AND SYSTEM FOR DYNAMIC ASSEMBLY OF MULTIMEDIA PRESENTATION THREADS"; and U.S. application Ser. No. 13/655,366 to Jeffery et al., entitled METHOD AND SYSTEM TO ANALYZE SPORTS MOTIONS USING MOTION SENSORS OF A MOBILE DEVICE, filed Oct. 18, 2012; the subject matter of each incorporated by reference herein in its entirety.

BACKGROUND OF THE INVENTION

1. Field of the Invention

The present invention relates to using a mobile device with integrated motion sensing to evaluate golf swings and provide customized golf club fitting, specific golf product recommendations, and targeted golf-related marketing.

2. Description of the Related Art

Customized golf clubs "fitted" to the swing of a particular user have the advantage of enabling average players to significantly improve their scores by hitting the ball a longer distance and more accurately. With a custom fit driver for example, an average-to-intermediate player may hit the ball 10 to 20 yards farther, and will more accurately hit the fairway, instead of the rough or out of bounds, which in turn may lower their score by several strokes in a round. For advanced players, customized golf clubs are an essential component of competitive play, as most players have custom fit golf clubs and those that do not are at a disadvantage.

Hitting a golf ball long and straight is in principle easy but in practice is extremely difficult: The golfer has to generate maximum club head speed (swing speed) and has to hit the golf ball square at impact with the golf club head. The distance a golf ball flies in the air then rolls on the ground is determined by physics. For the driver, for example, various manufactures have shown that for 100 miles per hour (mph) club head speed the optimal drive distance is realized from a 150 mph ball velocity off the club face, an 11 to 13 degree launch angle at impact and a ball spin rate 2500 to 2900 revolutions per minute (rpm). Different golf clubs (irons, woods, etc.) each have optimal parameters to enable maximum ball distance derived from experiments.

For a particular golfer the important golf club variables for custom club fitting are the lie angle, shaft flex, and the loft or angle of the face of the golf club. Additional variables include the weight of the golf club and the weighting distribution (location of the center of mass in each case) of the both the golf club and golf club head. For example, a golfer with a low swing speed would benefit from a lighter and softer, more flexible, shaft. This is because the shaft acts like a spring with a natural resonance; hence the ideal is to match the resonance of the shaft with the swing speed of the golfer to maximize the club head speed. Furthermore, a lighter shaft is easier to swing faster. As another example, a golfer who consistently slices the ball (has the club head open at impact which makes the ball curve to the right), would benefit from golf clubs with club heads that are both angled a few degrees closed and weighted closer to the shaft so as to increase their angular velocity around the shaft, squaring the club to the ball at impact. Conversely, a golfer who consistently hooks the ball (has the club head closed at impact which makes the ball curve to the left), would benefit from golf clubs with club heads that are a few degrees open and are weighted farther from the shaft so as to decrease their angular velocity around the shaft, squaring the club to the ball at impact.

Several golf club manufacturers offer custom golf clubs. PING for example, color codes their golf clubs to the type of player, and Taylor Made has pioneered adjustable golf club heads that can be customized to a player via adjusting various screws and weights in the club head. The custom golf club fitting process ranges from rather primitive to very sophisticated.

In very basic club fitting for irons, for example, the fitter may tape the end of the club with masking tape and have the user make several swings hitting a ball into a net off a mat. As the club impacts the mat on the floor scuff-marks appear on the masking tape on the bottom of the club head at one end or the other. Scuff marks close to the shaft suggest that the player has a positive lie angle (is angling the far end of the club head up at impact), scuff marks away from the shaft suggest the player has a negative lie angle (is angling the far end of the club head down at impact). The club head is then bent in a vice using a bracket device to measure the angle of the club head, and the golfer repeats the process with new tape and the adjusted club until the scuff marks appear in the middle of the head—the club head is then approximately square at impact to the ball. All of the irons are then bent in a vice to the same lie angle and open or closed angle.

For the most basic fitting (which is typical in the average golf store) the shaft flex is selected based upon a subjective estimate of the golfer's ability. For example, a young and strong and/or expert golfer will be recommended a stiff shaft flex, a middle-aged high handicap golfer an intermediate flex, and a beginner, female, or older golfer a soft (more flexible) flex. The approximate cost for fitting golf clubs using this basic approach is several dollars per golf club, however the shaft selection often lacks any data to support the recommendation, and the masking tape scuff-mark approach for lie angle is fraught with potential errors, so that golf clubs fitted using this approach are often far from optimal.

The most sophisticated golf club fitting utilizes a high-speed digital camera and computer system, called a launch monitor system, to actually measure the club head speed, the speed of the golf ball and the flight angle of the golf ball following impact (the launch angle), the club lie angle pre and post impact, and the ball spin rate. The club fitter's goal is to create custom golf clubs so that an individual golfer creates, as closely as possible, the optimal club head speed, ball speed, launch angle, and ball spin rate for each specific club.

These systems are expensive and are often available only in a few high-end golf shops. The club fitting process involves the golfer taking many swings hitting a ball into a net or on a driving range with the launch monitor focused at the impact area of the club head with the ball. Additional data includes the measured flex of the existing golf club shaft for comparison. The shaft flex may be measured by clamping the shaft at the grip, then pulling back the head and letting the club oscillate—the frequency of oscillation is the resonance of the shaft. The club fitter takes the launch monitor data and, via a table of club specification data, looks-up the optimal club for the measured swing metrics. The table is often stored in a database or spreadsheet on the same personal computer the launch monitor software is loaded onto.

As an example for fitting the driver, a golfer swings clubs with different heads and shafts and the fitter works to optimize their carry, roll distance, and accuracy based upon the launch monitor data—the improvement in performances is measured relative to their original not-fitted golf club. The results are new clubs accurately fitted to the specific golfer; however the cost for fitting clubs using this approach is several hundred dollars for each golf club. Hence, these systems are currently available only to the affluent and to professional golfers.

The prior art includes a few patent and patent publications disclosing the use of gyroscopes and accelerometers for analyzing golf swings. However, these methods require customized attachments inserted into, or attached to, a golf club. For example, Published Patent Application No. 2005/0054457 to Eyestone discloses a method and system for golf swinging analysis and training that employs a device inserted into the distal end of a golf club. The device includes a gyroscope and an accelerometer and can wirelessly communicate with a personal computer to capture golf swing data while the user swings the golf club. Similarly, WIPO Publication No. WO2011/085494 to Hashimoto et al. discloses such a device with a gyroscope and accelerometer that attaches to the outside of a golf club.

Furthermore, PING, Inc. has developed a putting analysis system wherein users hit physical balls while putting, and motion sensors in a mobile phone clipped onto the physical golf club provide data used by an application to analyze the putt, and to compare results to that of professional golfers. These data can be used to custom fit a golf putter. However, such prior art systems and methods require impact with a physical ball, and/or use of, or attachment to, sports equipment.

SUMMARY OF THE INVENTION

One aspect of the disclosure relates to a method of swinging a mobile device to simulate swinging of a golf club in order to evaluate a user's golf swing for customized golf club fitting. In an embodiment, certain of method steps can be performed by a processor of the mobile device. In another embodiment, some of the method steps can be performed on a cloud-based server for multiple mobile devices concurrently.

According to an aspect of the invention, the method comprises swinging a mobile device having motion sensors integrated therein to simulate a golf swing; evaluating the simulated golf swing to determine at least one characteristic of a custom-fitted golf club; and outputting information related to the determined at least one characteristic. In an embodiment, the mobile device is held by a user. In this embodiment, the method further comprises holding the mobile device in an initial position; and emitting a human-perceptible signal indicating readiness to start the swinging. In an alternate embodiment, the mobile device is attached to a golf club. The motion sensors can include a gyroscope and an accelerometer.

According to an aspect of the invention, Evaluation of the simulated golf swing can include evaluating motion data (e.g., one or more of pitch, roll, and yaw of the mobile device). Evaluating the golf swing can include estimating a velocity of the mobile device using motion data from the mobile device. The at least one characteristic can include golf club shaft stiffness determined at least in part using an estimated velocity of the mobile device; golf club shaft weight determined at least in part using an estimated velocity of the mobile device; golf club shaft flex point determined at least in part using an estimated velocity of the mobile device; golf club head lie angle determined at least in part using gyroscope data; a golf club head loft angle determined at least in part using an angle of approach of the mobile device through impact; a golf club head angle relative to the shaft determined at least in part using gyroscope data; and a golf club head weighting determined at least in part using gyroscope data.

According to an aspect of the invention, the outputting step further includes displaying on the mobile device information related to a selected custom golf club. In an embodiment, the user can have information related to a selected custom golf club displayed on another display device separate from the mobile device. Additionally, a ball flight simulation can be displayed on the mobile device and/or the other display device. Other information that can be displayed on either device includes ball flight distance for one or more golf club (including one or more custom-fitted golf club), other information related to golf swings analysis, video clips of a virtual guide, and marketing information including specific golf product recommendations, and targeted golf-related marketing. Marketing messages can include one or more testimonial and/or upsell message. Furthermore, a map of the nearest participating golf stores can be included in (or linked from) the marketing message, the location of the golf stores determined based on global positioning information obtained from the user's mobile device location input from the user (e.g., based on zip code).

BRIEF DESCRIPTION OF THE DRAWINGS

FIG. 4 (*b*) illustrates backswing motion of a golf club and/or mobile device.

FIG. 4 (*c*) illustrates the case where the club head path through impact is the same as the backswing.

FIG. 4 (*d*) illustrates the case where the downswing swing path is different from the backswing. The optimal club loft angle is a function of the swing path angle and club head speed through impact.

DETAILED DESCRIPTION OF THE INVENTION

The present invention involves swinging a mobile device to simulate swinging of a golf club in order to evaluate a user's golf swing for customized golf club fitting.

As used herein, a mobile device refers to a hand-held device having a microprocessor, memory, and integrated motion sensors. Examples of such mobile devices include the Apple iPhone, Apple iPod and Samsung Galaxy smartphone. It is to be understood that such mobile devices mentioned herein are meant for illustrative purposes only.

As used herein, calibration point refers to the location in time and space of the mobile device in a set-up position prior to the start of the golf swing.

As used herein, impact point refers to the location in time and space of impact with a virtual golf ball.

As used herein, a display device refers to any Internet connected display capable of graphically displaying a Web page.

Figure 1:
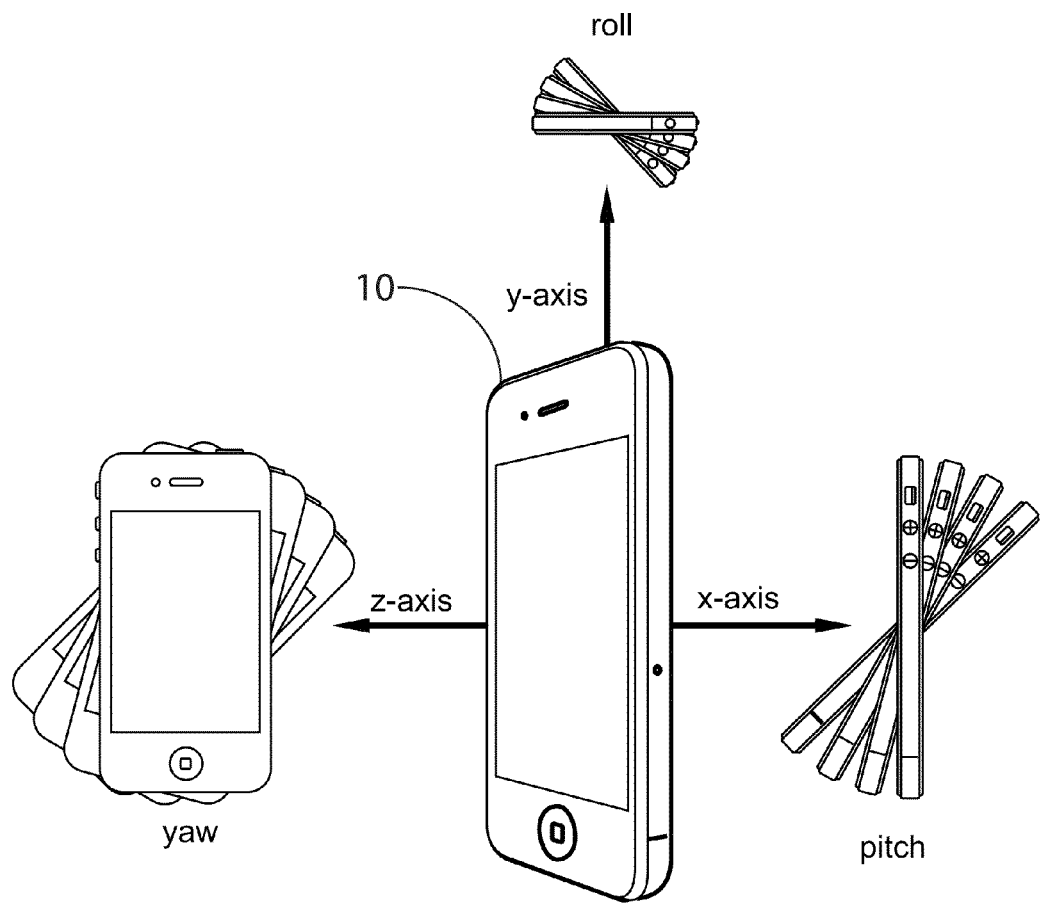
FIG. 1 illustrates motion data obtained from a mobile device having integrated motion sensors.

FIG. 1 illustrates various types of rotational movement measured by the motion sensors of a mobile device 10. These sensors include an accelerometer to capture X, Y and Z acceleration data (expressed in G's along a respective axis), and a gyroscope to measure pitch, roll and yaw of the mobile device 10 as it moves (expressed in radians with respect to a respective axis). At present, the motion sensors sample at about 100 times per second (100 hertz), with this data made available (by either polling or having the data pushed) to an application loaded on the mobile device 10. A representative gyroscope useable in conjunction with the present invention is the L3G4200D gyroscope made by STMicroelectronics, Inc. However, it is to be understood that the present invention is not limited to motion sensor technology currently available.

Figure 2:
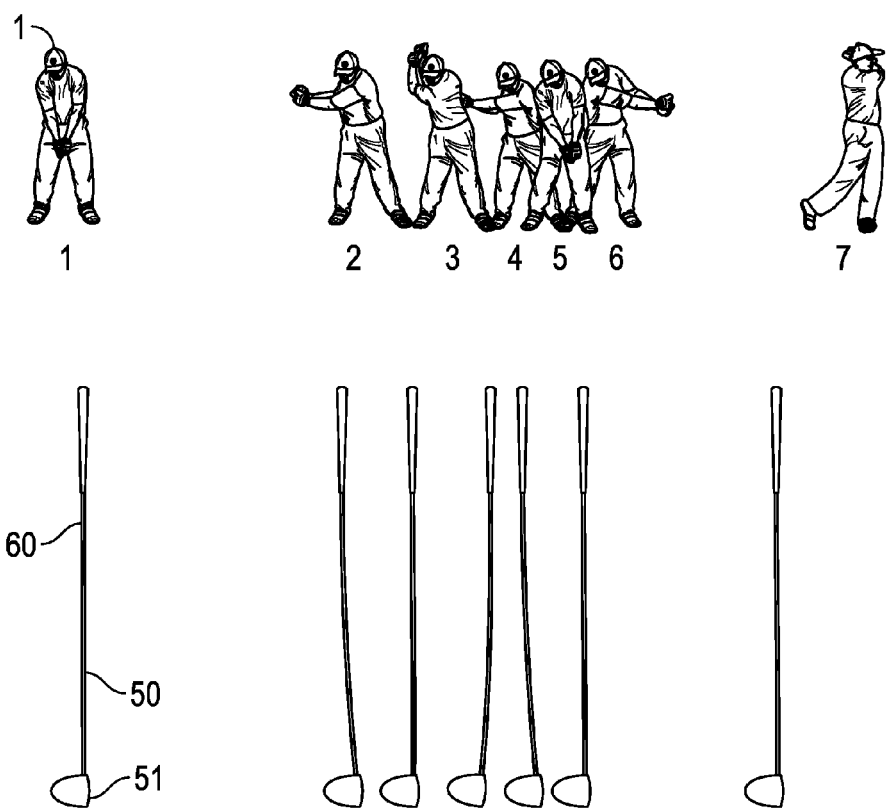
FIG. 2 illustrates how the golf club shaft flexes, or bends, during a golf swing where the flex is a function of the swing speed, the stiffness of the shaft, and the club head weight.

FIG. 2 illustrates how a golf shaft 50 bends during a golf swing where the user 1 is simulating the golf swing motion with a mobile device. The golf club 60 comprises a shaft 50, a head 51, and a grip 49. The goal is to maximize the speed of the head 51 at the impact point so as to maximize the ball flight distance. Therefore swing speed, which is related to club head speed, is a primary input to the customized golf club configuration.

The golf club 60 variables that impact swing speed include the stiffness of the shaft 50 and flex point, the weight of the shaft 50, and the weight of the club head 51. Weight is important because a lighter golf club can be swung faster than a heavier one. Furthermore, the shaft acts like a spring and imparts an additional kick to the golf ball through impact (4)-(5)-(6) in FIG. 2, which is why the flex point is also important.

There are three different possible flex points on a golf shaft that are commonly manufactured: high, medium and low. A high flex point means the bend of the shaft in the swing is close to the grip, typically used by professional players to ensure accuracy of a golf shot with a stiff shaft. A mid flex point is approximately a third of the way up from the club head, and is for average players with moderate swing speeds. A low flex point is close to the club head, and is good for low swing speed golfers as it "kicks" the ball into the air.

The challenge is if there is too much bending of the shaft during a swing then the club head looses directional control (accuracy), and if there is not enough bending at low swing speeds the golfer does not benefit from any shaft kick.

Hence, the optimal custom golf club component selection is critically dependent on the swing speed of the golfer. Once the swing speed is determined, the optimum flex point and optimal weight of the shaft 50, for a specific club head 51, can be determined that maximize the club head speed of the assembled fitted golf club with an acceptable accuracy.

Note that the swing speed defines the optimal shaft stiffness, flex point, and shaft weight. For example, a person with a low swing speed would benefit from a more flexible shaft with a low kick point (increasing the kick through impact) and a lighter shaft (to swing faster thus increasing club head speed). The linkage between swing speed and the components (shaft flex point and weight) is determined by empirical measurements and rules which define the optimal components to use for a particular swing speed.

Figure 3:
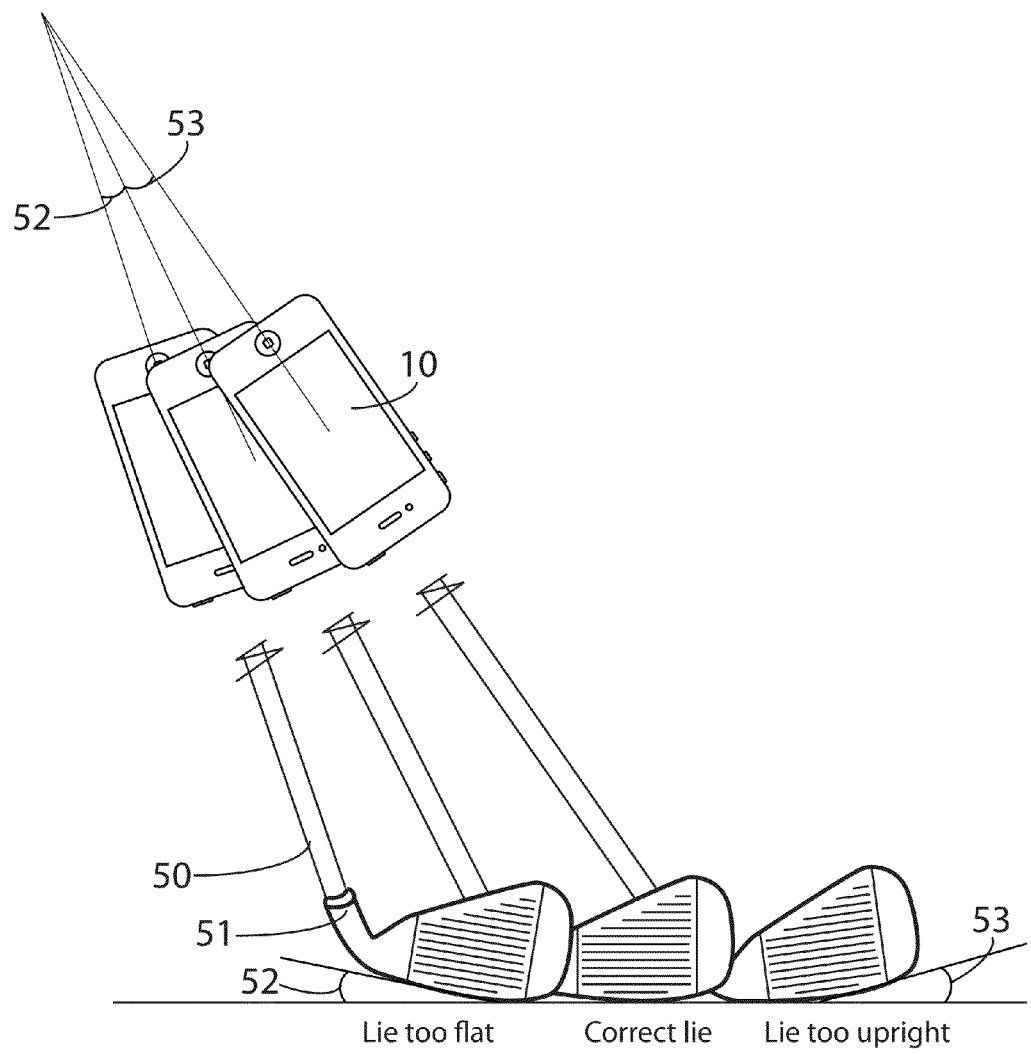
FIG. 3 illustrates how club head lie angle is related to the mobile device yaw angle.

FIG. 3 illustrates three different lie angles at the impact point and how the lie angle of the club head 51 is related to the yaw of the mobile device 10 in each case. The "Correct lie" is when the clubface is square at the impact point and the difference in yaw of the mobile device 10 from the calibration point and impact point is zero. As depicted, the lie angle 52 is too flat, the lie angle 53 is too upright; the respective relationships with the difference in yaw angles at the calibration point and the impact point of the mobile device 10 are shown. The optimal lie angle can be determined from the height of the golfer and the difference in yaw of the mobile device at calibration point and the impact point.

Figure 4A:
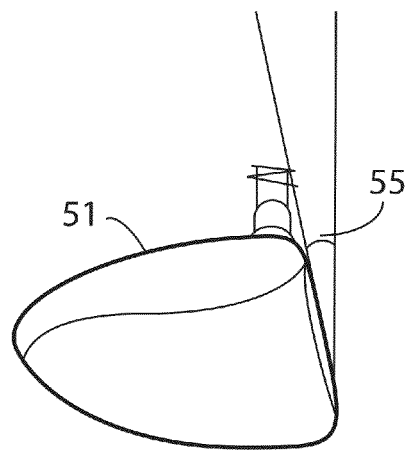
FIG. 4 (*a*) illustrates loft angle of a golf club head.
Figure 4B:
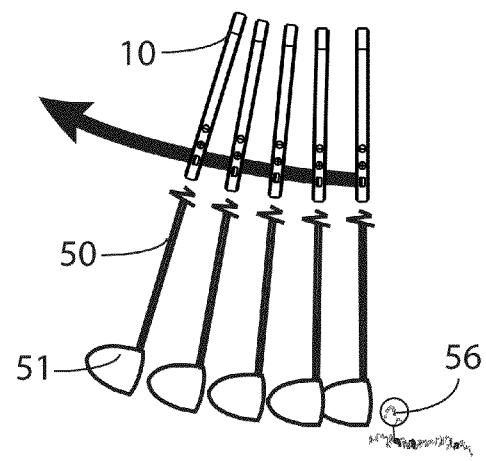
Figures 4C, 4D:
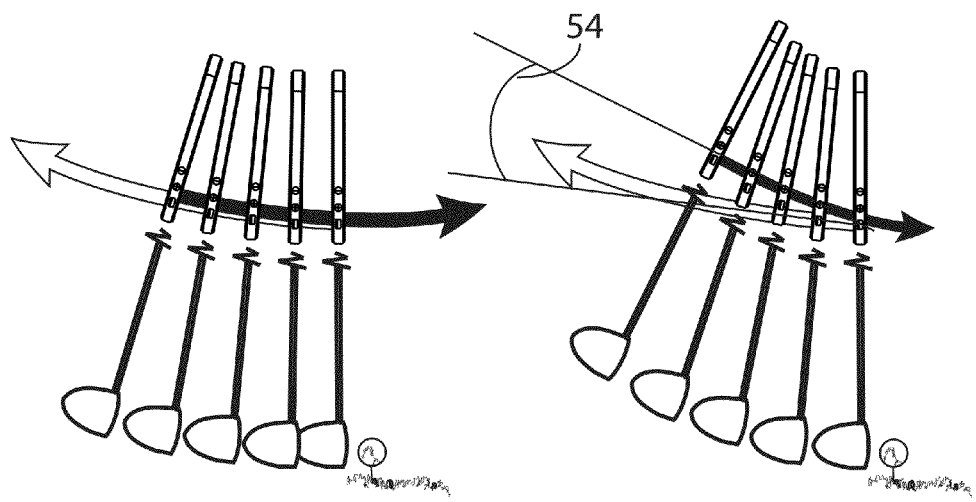

FIG. 4 (a) illustrates the loft angle 55 of a golf club head 51. For each golf club, the optimal launch angle to maximize ball flight distance is a function of the club head speed and ball spin rate. For example for the driver, various manufactures have shown that for a 100 miles per hour (mph) club head speed the optimal drive distance is realized from a 150 mph ball velocity off the club face, an 11 to 13 degree launch angle at impact and a ball spin rate 2500 to 2900 revolutions per minute (rpm). Thus empirical measurements define the optimal launch angle for a specific golf club type, club head speed and ball type.

FIG. 4 (b)-(d) illustrate how the loft angle of the mobile device 10 is related to the velocity vector of the mobile device at the impact point with a virtual golf ball 56. FIG. 4 (b) is the backswing motion of the golf club and/or mobile device. FIG. 4 (c) illustrates the case where the club head path through impact is the same as the backswing. FIG. 4 (d) illustrates the case where the downswing swing path is different from the backswing. The optimal club loft angle is a function of the swing path angle and club head speed through impact.

That is, the club head loft should be adjusted so drives have consistent and optimum launch angles. The angle 54, which is the difference in back swing and downswing velocity vectors through the impact point, is the key variable to optimize the loft angle 55 so as to create a specific launch angle. In an embodiment, the velocity vector in the backswing FIG. 4 (b) and through impact FIG. 4 (d) can be calculated by integrating the X, Y, and Z acceleration.

Figure 5:
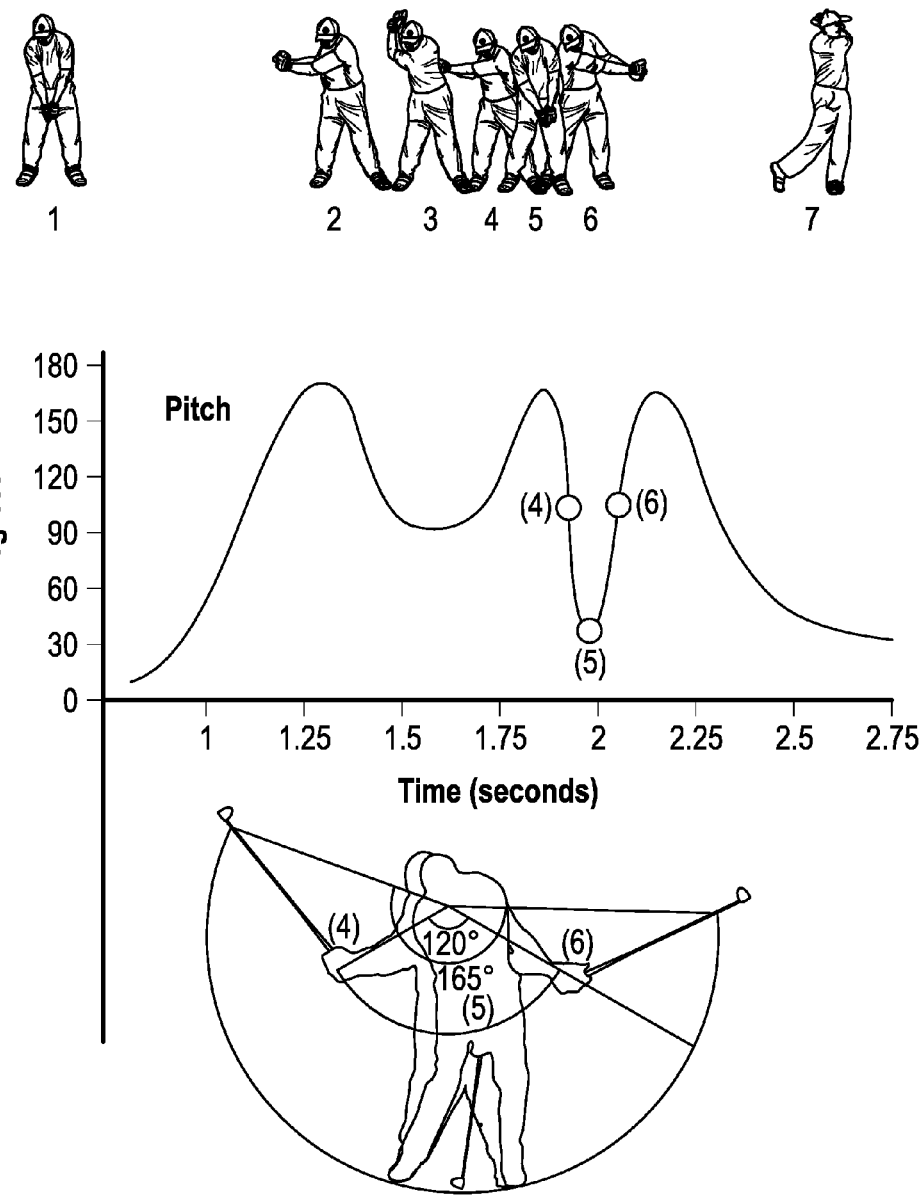
FIG. 5 illustrates how club head speed can be calculated from the motion of a mobile device. The mobile device swing speed can be determined by timing the swing of the mobile device between two detectable positions around impact with a virtual ball with multipliers for forearm rotation and wrist hinge through impact.

FIG. 5 illustrates how the speed of a virtual golf club head 51 can be calculated from the motion of the mobile device 10. The top graph is the pitch of the mobile device through a complete golf swing where the minimum (5) is the impact point. The first step is to calculate the swing speed of the mobile device. This is accomplished by timing the motion through two known points, (4) and (6) in the pitch curve of FIG. 5. Given the height of the golfer, their arm length (swing radius) can be approximated, and similar to a pendulum the mobile device angular velocity calculated by taking the arc length traveled per unit time. The mobile device velocity at the impact point is the angular velocity times the arc length.

The mobile device velocity is then scaled by multiplying by the club head's swing radius divided by the mobile device's swing radius: this is, a first order approximation of the velocity of the virtual club head assumes the club is swung directly in line with the arms. Expert golfers, however, amplify the velocity of the club head by rotating their forearms and hinging their wrists through impact. As depicted in the bottom of FIG. 5, the device has gone through a 90° arc length, the club head has traveled through nearly 180°. A second set of multipliers are used to account for forearm rotation and wrist hinge. These multipliers were obtained empirically by video taping professional and amateur golfers using a camera shooting at 1000 frames per second.

Figure 6:
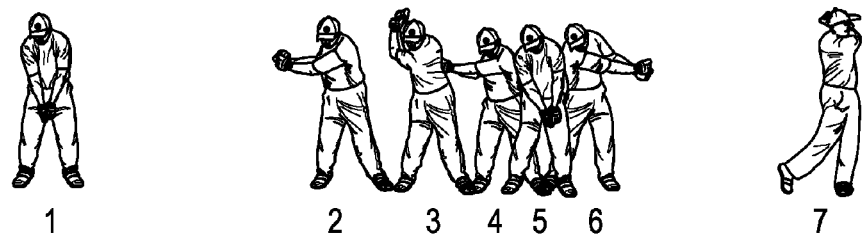
FIG. 6 illustrates how loft angle can be obtained from the difference of the yaw of the mobile device at the impact point and at the calibration point.
Figure 6:
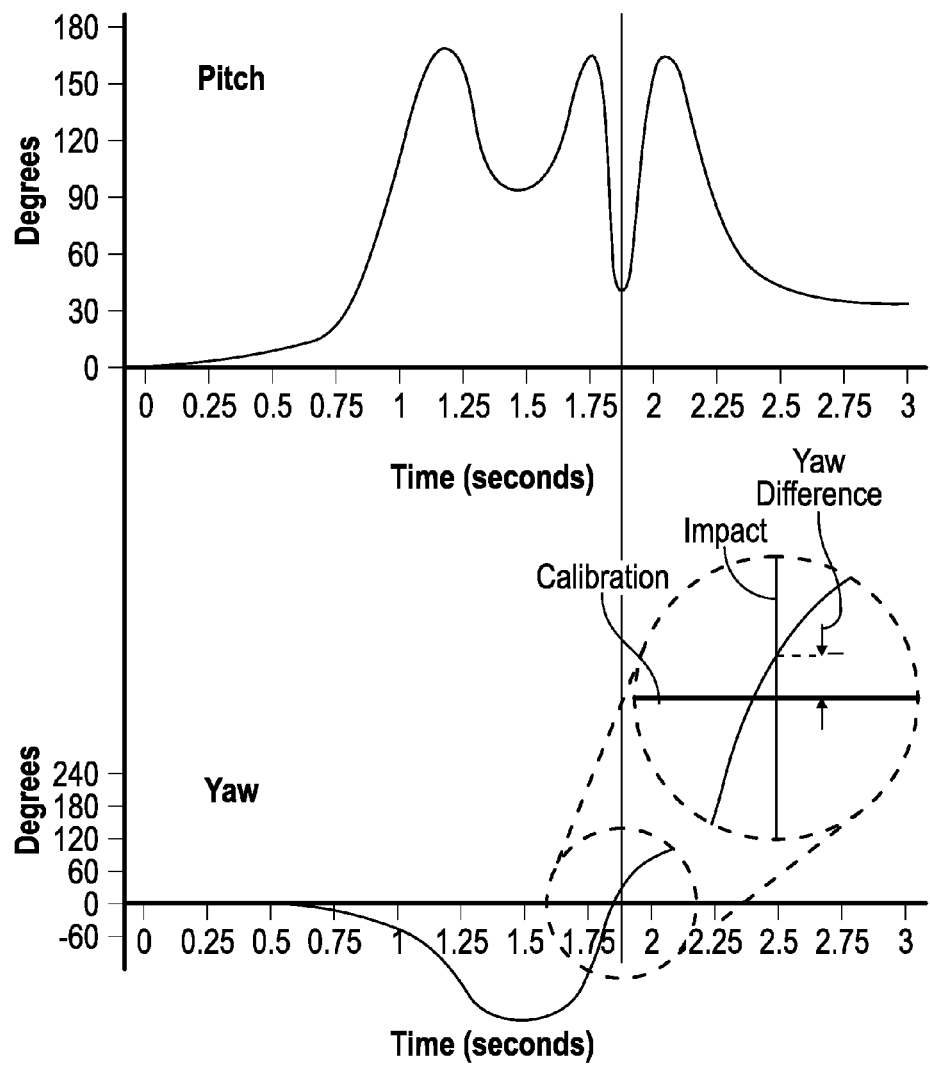

FIG. 6 illustrates pitch and yaw data as a function of time through a complete golf swing. The impact point is the second minimum of pitch, swing position (5), and from the yaw at this point we calculate the difference in yaw relative to the calibration point. These data are used for the lie angle optimization, see FIG. 3.

Figure 7:
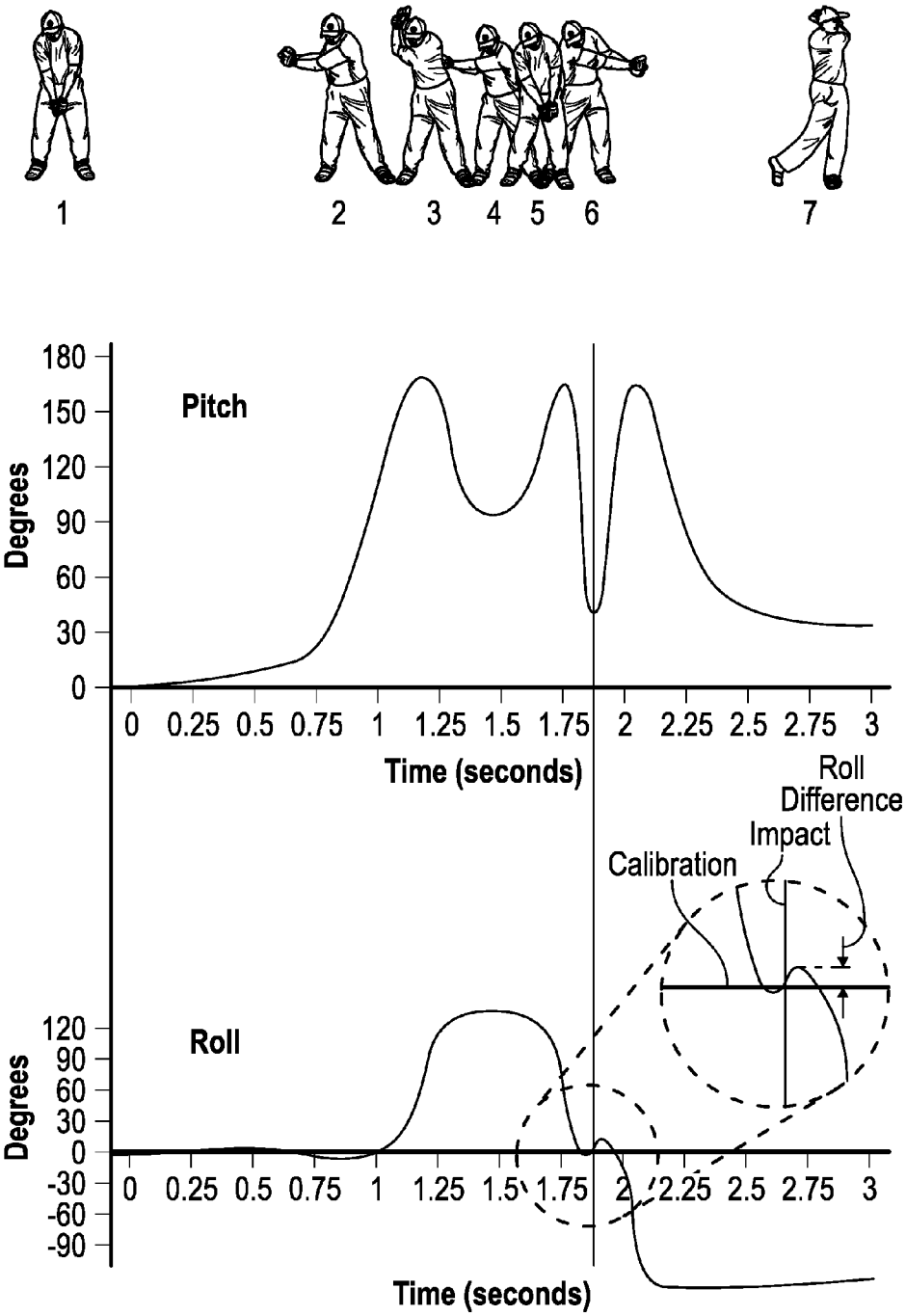
FIG. 7 illustrates how hook and slice can be obtained from the difference of the roll of the mobile device at the impact point and at the calibration point.

FIG. 7 illustrates how the mobile device 10 roll can be used to measure the degrees of hook and slice of the mobile device, the roll difference, which in turn can be used to fit a golf club which custom corrects the accuracy error. In general, consistent hooks and slices can be corrected by modifying the weighting and angle of the club head relative to the shaft.

For example, a person who consistently hooks the ball would benefit from a club head angled 2-4 degrees open and weighted such that the club head center of mass is as far as possible from the shaft: this weighting increases the moment of inertia around the shaft, and reduces the tendency to hook. One can also vary the thickness of the golf club grip 49. A thicker grip tends to promote a slice or a fade, which can partially correct a hook, and conversely a thinner grip promotes a draw, which can correct a slice—although a thinner grip only improves the slice if the existing grip is too fat. The optimal adjustment can be determined by comparing roll data from set-up to impact, and applying the appropriate rules for the magnitude of the hook or slice taking into account other factors such as swing speed.

Figure 8A:
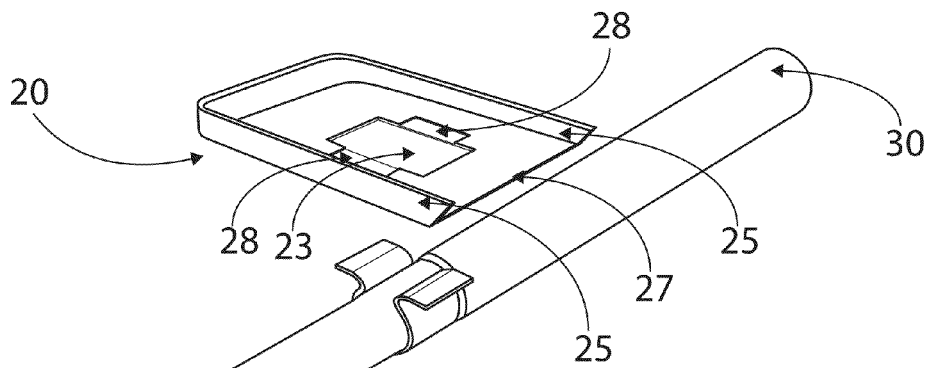
FIGS. 8 (*a*) to (*c*) illustrate an exemplary holder for a mobile device attached to a golf club.
Figure 8B:
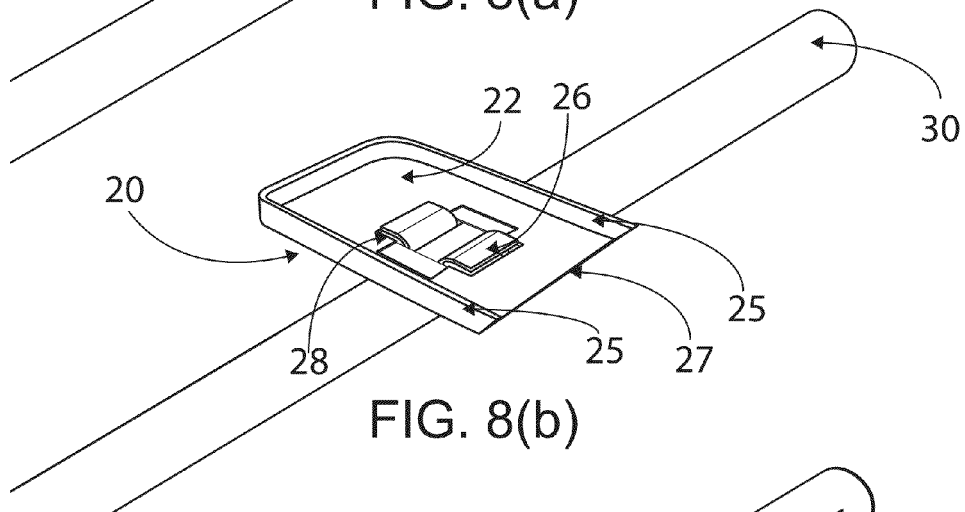
Figure 8C:
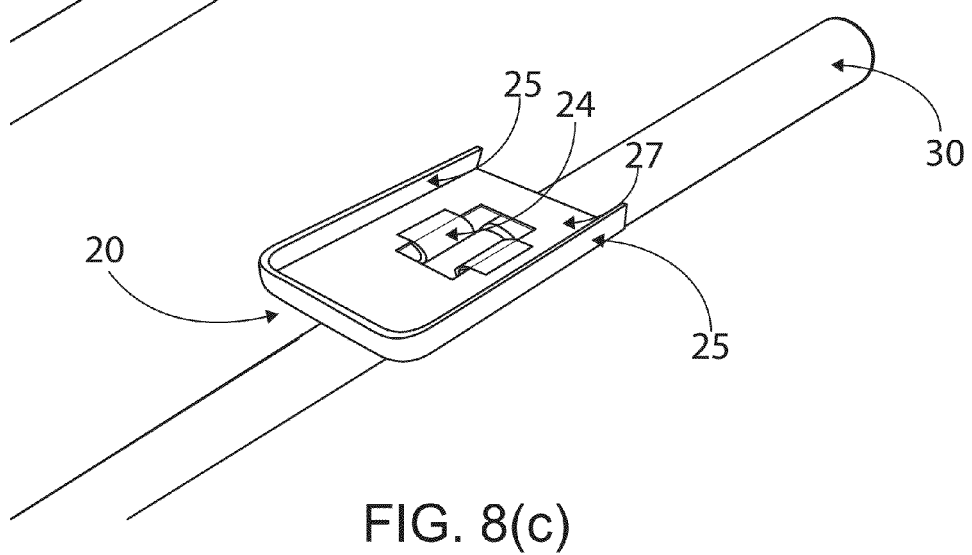

In an alternate embodiment of the present invention, the mobile device 10 can be attached to a golf club. In this case, the user swings the golf club with the mobile device 10 attached thereto, instead of holding the mobile device 10 in the user's hand. FIGS. 8(a) to (c) show an exemplary mobile device holder 20 to securely mount the mobile device 10 to a golf club 60.

Referring to FIG. 8(a), the mobile device holder 20 comprises a two-piece assembly including a C-shaped coupler 24 and a frame 22. As shown, the frame 22 is rectangular and includes a pair of grooved sides 25 and an open end 27. The C-shaped coupler 24 is structured so as to snugly fit around the golf club 30 (as shown). As shown, the frame 22 includes hole 23. The hole 23 is sized to accommodate collar wings 26 of the C-shaped coupler 24, which can be fitted through the hole 23 such that the frame 22 is positioned perpendicularly relative to the longitudinal axis of the golf club 30, as shown in FIG. 8(b). Next, the frame 22 is turned 90 degrees such that the open end 27 points away from the club head, as shown in FIG. 8(c). Once turned 90 degrees, the collar wings 26 settle into pockets 28 molded on the inside of the frame 22. Once the collar wings 26 are seated, the mobile device 10 can be slid into the frame, the grooved sides 25 providing a secure friction fit. In an embodiment the materials used for the frame 22 include a hard polycarbonate, most preferably, co-molded silicon together with the polycarbonate for an enhanced friction fit with the mobile device 10. However, it is to be understood that various other materials may suffice, such as stainless steel, aluminum, or another metal; polyethylene, acrylonitrile-butyl-styrene (ABS), polyvinyl chloride, and nylon, or another plastic. Further it is to be understood that the particular manner in which the mobile device 10 is mounted to the golf club 60 (i.e., using the mobile device holder 20) is presented for illustrative purposes, and is not meant to be limiting.

Figure 9:
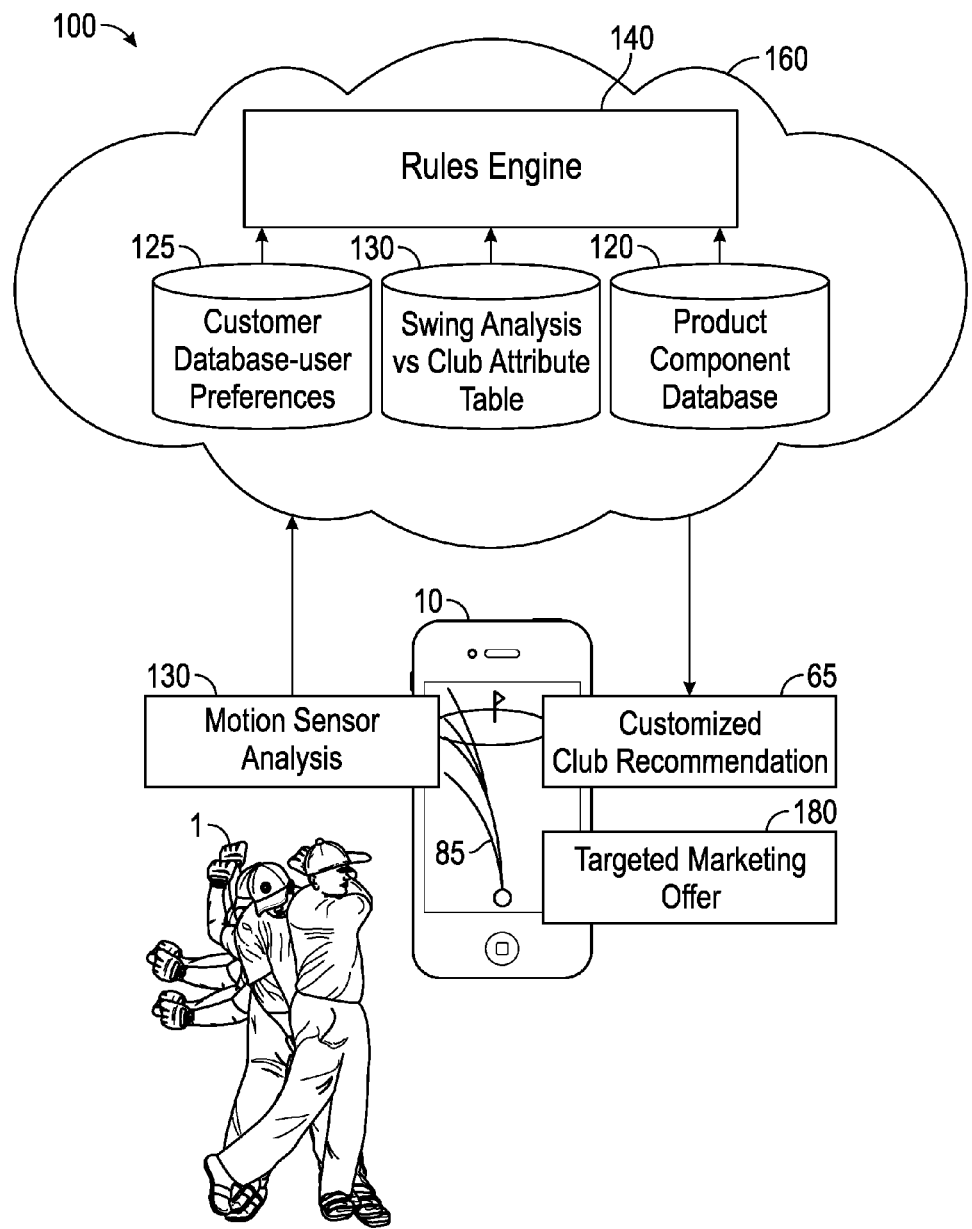
FIG. 9 illustrates an exemplary cloud-based architecture for a virtual club fitting lab, according to an embodiment of the invention.

FIG. 9 illustrates an exemplary architecture of a virtual golf club fitting lab 100, with the mobile device 10 in communication with a cloud-based server 110. The swing data analyzer 130 is executed on the mobile device 10 and the data is passed via the network to the server 110 which uses a rules engine 140 with business rules to determine an optimal customized club built virtually by combining data from three sources: (1) customer database and user preferences 125 (male vs. female, left vs. right handedness for example), (2) the swing analysis vs. club attribution table 130 (driver vs. wedge for example), and (3) a product component database 120 (all components such as shafts and heads to select from). The club recommendation is then passed back to the mobile device user 1 via the mobile device 10. Alternately, the swing data analyzer 130 can also run entirely on the mobile device 10, with the product component database 120 and analytic engine integrated into the "app".

FIG. 9 also illustrates an embodiment with display output on the mobile device 10. This display includes, but is not limited to, ball flight 85 for various swings and different club configurations, customized club recommendation 65, which may include graphics, textual data, animations and video clips of professional golfers or instructors, and targeted marketing offers 180.

Figure 10:
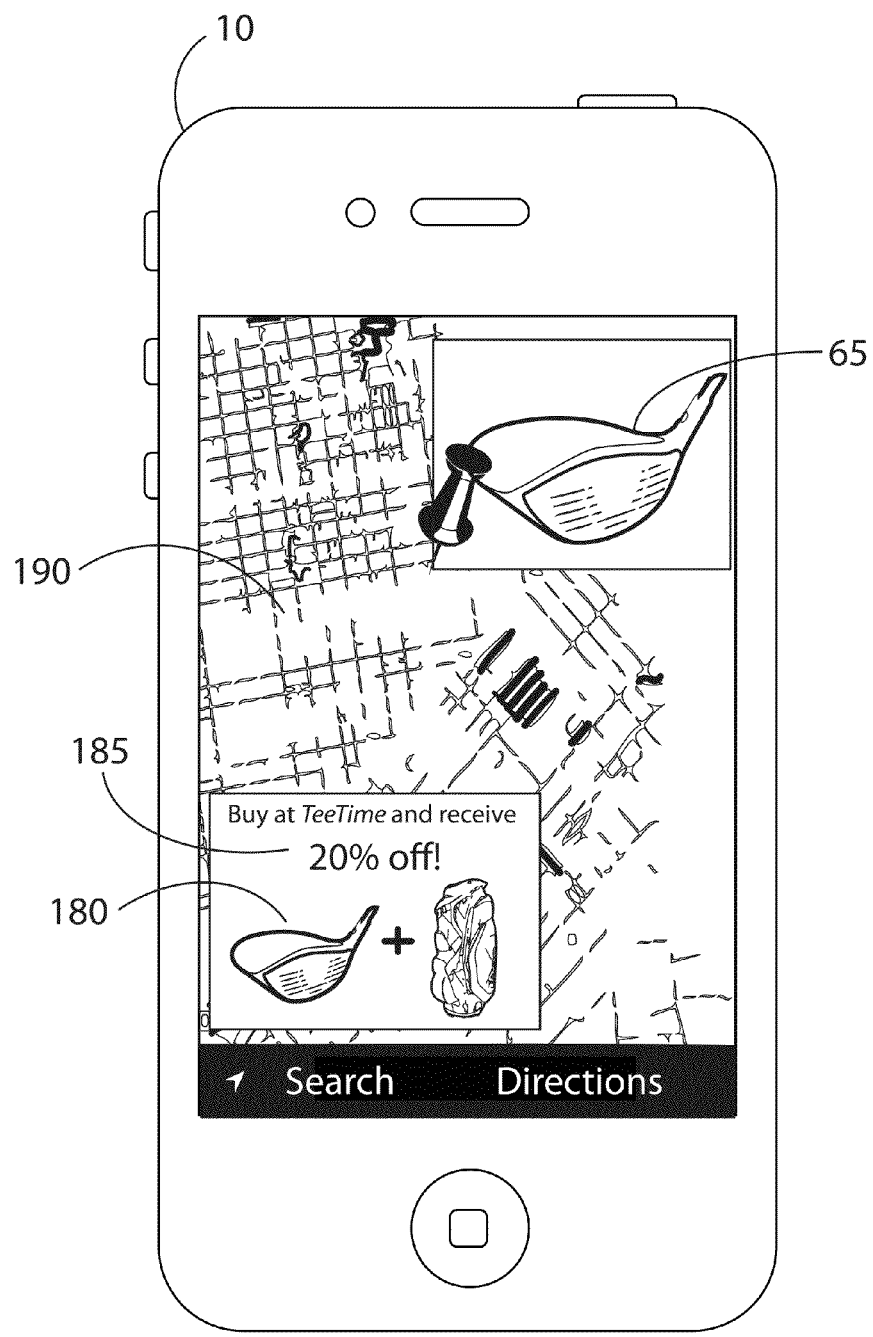
FIG. 10 illustrates exemplary targeted marketing technique based upon the club fitting, according to an embodiment of the invention.

FIG. 10 illustrates customized marketing 180 delivered to the mobile device with (1) the customized golf club fitting recommendation 65, (2) the mapped location 190 of a golf store with the club(s), (3) a bundled product offering 180 and (4) a discount offer 185 for purchasing the bundled set.

Figure 11:
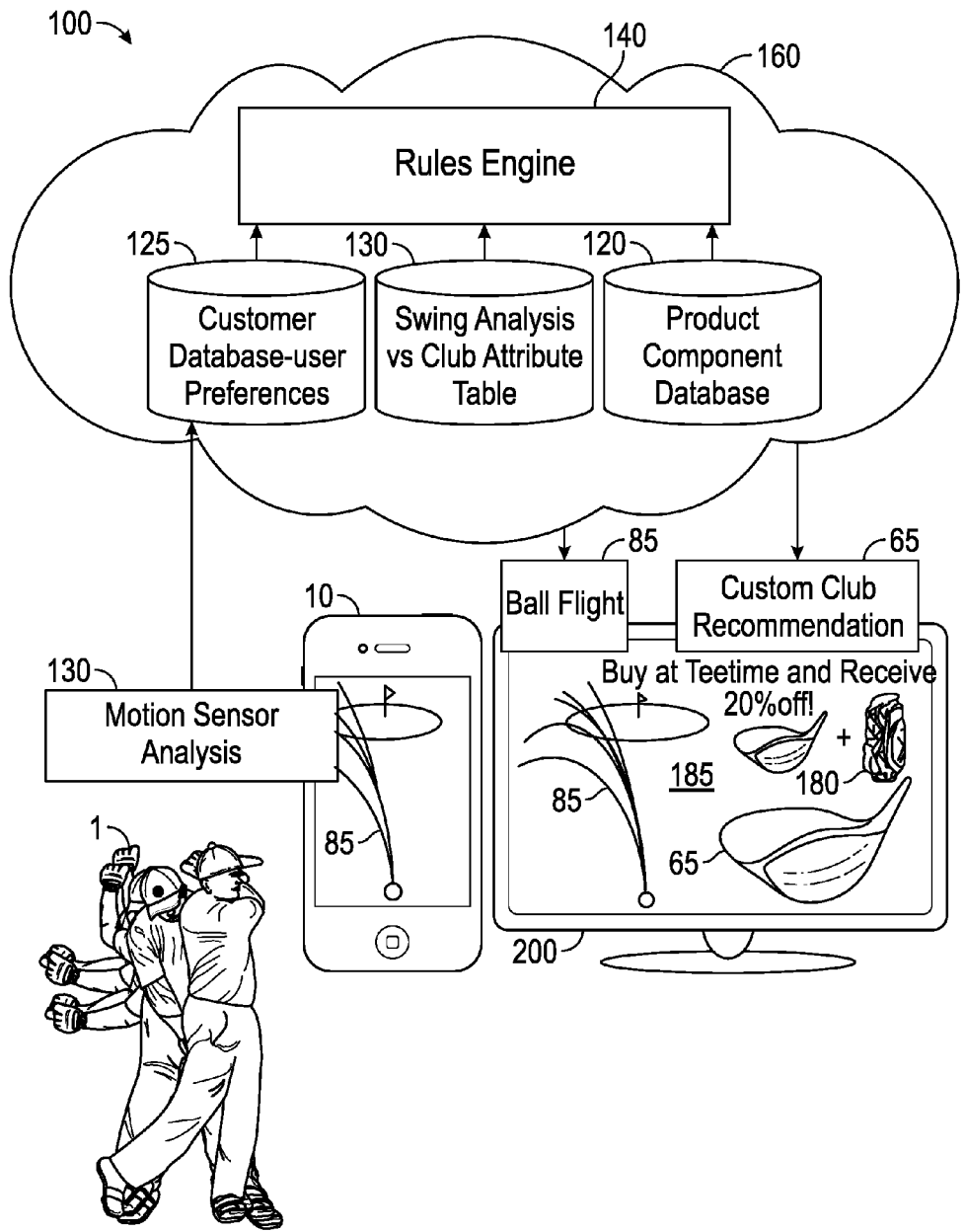
FIG. 11 illustrates an exemplary cloud-based architecture for a virtual club-fitting lab with a networked display device, according to an embodiment of the invention.

FIG. 11 illustrates an exemplary architecture of a virtual golf club fitting lab 100 where, in an embodiment, the virtual golf club fitting lab also includes a networked web enabled display device 200. In this embodiment the ball flight 85 and/or product recommendations 65, and/or target marketing offers 180 and/or 185 are shown on the display device 200 responsive to the user mobile device swing motions and interactions with the system.

Figure 12:
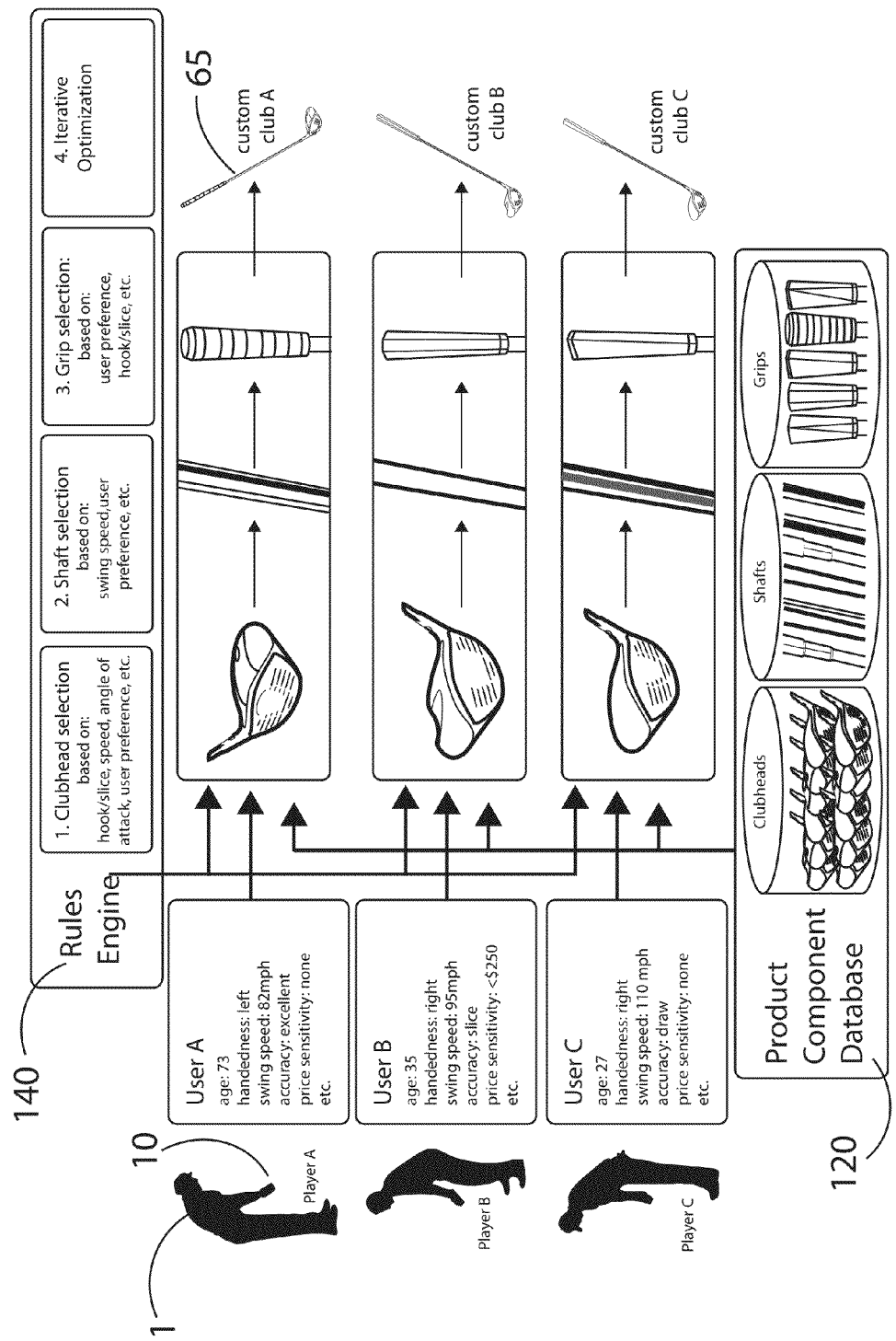
FIG. 12 illustrates an exemplary method for selecting custom golf clubs for different users A, B and C from a golf product component database.

FIG. 12 illustrates an exemplary method for recommending custom golf clubs to different Players A, B and C. Each player has very different demographic traits and different swing data captured by their respective mobile devices. The rules engine 140 configures the custom golf club for each user by applying a set of rules, which are essentially filters, to the product component database. The rules are applied to sequentially select the optimal golf club head, shaft and grip, and iterate between possible components to optimize the system with constraints. The output is a recommended custom golf club 65 (or plurality of clubs) for each player that are optimized based upon user input data, swing data captured by the mobile device, and other data such as may be stored in a customer relationship management system or other database.

These figures and the related methods for analysis are described in greater detail hereinafter.

Virtual Golf Club-Fitting Lab

In an embodiment of the present invention, the virtual golf club-fitting lab 100 comprises two options: the mobile device can either be attached to the golf club in a customized holder (see FIG. 8), or simply held in the user's hands. The former approach is more accurate for lie angle and loft analysis; however, the latter has the advantage that no specialized holder is necessary and the results are nevertheless accurate for the most golfers.

The virtual golf club fitting lab 100 comprises three major components: (1) the product component database 120, (2) a motion sensor analyzer 75, and (3) a rules engine 140. The product component database 120 includes, but is not limited to, information identifying golf club components having specific shaft lengths and diameters, weights, stiffness, club head weights, loft angles, lie angles, etc. The motion sensor analyzer 130 has as inputs the X, Y and Z acceleration data from the accelerometer ($a_x$, $a_y$ and $a_z$ respectively) and pitch, yaw and roll of the gyroscope in the mobile device 10, measured during the swings. The motion sensor analyzer 130 takes the accelerometer and gyroscope data and outputs golf swing specific variables that are input to the rules engine 140. The rules engine 140 analyzes the input gyroscope and accelerometer swing data and selects or builds a recommended customized dynamic golf club for a specific user, based on available component information stored in the component database 120, the swing analysis vs. club attributes table 130 (mapping swing motion characteristics for different clubs such as sand wedge, 7 iron or driver, to their respective components) and using specific rules derived from empirical measurements. The rules engine 140 may be coded to run on the mobile device 10, or may run on a server in the distributed architecture.

The virtual club-fitting process is further clarified in the following example of a preferred embodiment. Initially, a user touches an icon on the screen of the mobile device 10 to invoke the virtual golf club fitting lab 100 (embodied herein as an application on the mobile device 10). In an exemplary embodiment, the user interacts with a virtual coach who guides the user through the club fitting process using one or more video clips. Via a survey instrument, or voice recognition, the virtual guide collects data such as: gender, handedness (left or right), height, type of club to fit, etc. Then, holding the mobile device 10 in the user's hand as if a golf club, the user simulates an actual swing. For data collection, in a preferred embodiment, the user swings at least 20 times, each time holding the mobile device 10 at an address position and waiting for a vibration or audible "swing" indication. These multiple swings enable swing data that can be screened for outliers and averaged to smooth the motion data. It is anticipated that future releases of the iPhone and Android-based devices will include motion sensors that are more accurate, so that only a few swings (less than 10) may suffice.

Data gathered by the internal gyroscope and accelerometer of the mobile device 10 is then analyzed via the motion sensor analyzer 75 and relevant feedback (swing speed, orientation, acceleration, estimated ball flight path/distance etc.) can be given. In an embodiment, users can see ball flight simulations 85 on their mobile device 10 following each swing, or can connect to a web-based version built in HTML, CSS, and Javascript from their personal computer, web-enabled television (TV) or tablet computer 200. In a preferred distributed embodiment, the ball flight simulation is displayed on a Web page that can be displayed on any web-enabled TV or computer screen 200.

The distributed application can be accomplished using a Comet (Ajax push, HTTP server push) application that allows the iPhone (or other mobile device 10) to push golf swing data to the browser. As a user practices in the virtual golf club fitting lab 100, their swing data can be added to a cloud-based database where it is accessible at a later "history" section of the app. Several months after being fitted for new golf clubs, a golfer can then re-evaluate their swing as the optimal fitted clubs may have changed.

In the distributed architecture, the user is connected to a server wherein the user has a unique account and identifier. This networked configuration enables the user to swing the mobile device 10 and see the ball flight and related data on any other web-enabled devices 200 such as an Apple iPad, personal computer (PC), or Web-enabled TV. That is, as the user swings the mobile device 10 the ball flight can be animated (and video clips of the virtual coach displayed) on a different display 200 from the mobile device 10. This embodiment is described in detail in co-pending U.S. application Ser. No. 13/659,774 to Jeffery et al., entitled METHOD TO PROVIDE DYNAMIC CUSTOMIZED SPORTS INSTRUCTION RESPONSIVE TO MOTION OF A MOBILE DEVICE, filed Oct. 24, 2012.

As discussed earlier, the main variables used for club fitting are club head loft and weighting, lie angle, shaft weight, stiffness, and flex point, and (potentially) grip thickness.

Shaft stiffness and flex point is optimized so as to maximize the club head speed given the swing speed of the golf club: the shaft acts like a spring which can store energy and release this energy through impact. However, there is a tradeoff between accuracy and distance. For example, a high swing speed will bend a soft flex shaft past optimal, and this may cause a slice of the ball, which is a loss of accuracy.

The optimal shaft stiffness and flex point is derived via a table look up based upon the overall swing speed of the golf club. In general, a high swing speed (100 mph or more) will correspond to a stiff shaft and a low swing speed, of 60 mph or less, a soft shaft flex. However, various manufacturers have different golf club shaft stiffness and flex points that produce the maximum distance at specific speeds. Hence, given the accurate measurement of a golfers swing speed, it is possible to select the optimal shaft for a specific golfer. So for example, a golfer with an 85 mph swing speed should be fitted with a shaft flex tuned between stiff and regular, which are possible given a vendor database of many different shafts, and/or by potentially cutting the end of a shaft to change its resonance characteristics. These specific product data are pre-loaded into a product table in the component database 120 to enable the swing speed to specific shaft product look-up. The mobile device swing speed analysis is a critical component of the invention, and is described in detail in the following section.

The second major variable is the lie angle of the golf club. This is the angle that the face of the golf club should be adjusted to ensure the head of the club is square at impact, and is directly related to the yaw angle of the mobile device, pre and post impact. The angle of the mobile device 10 and the clubface are directly related so there is a one-to-one correspondence. In an embodiment, the yaw angle is compared at address (just before starting the swing) to the yaw angle at impact, see FIGS. 3 and 6. How these two points of the swing are found is described in detail in the following section. We assume that the club at address is placed square to the ball so that the difference in degrees is the angle the club should be adjusted so that at impact it is square to the ball, which is most important.

Loft is the third major variables for custom club fitting. For the driver, for example, to achieve the maximum ball flight the optimal for a 100 mph club head speed is an 11 to 13 degree launch angle. Other swing speeds have different optimal launch angles. The launch angle and loft of the club are related to the angle of approach of the club head to the ball at impact, see FIG. 5. For example, if the swing path through the ball is horizontal, as the club impacts the ball backspin is imparted to the ball and the ball spins off the clubface. Complex physics are at play but experiments have shown for the driver that a 100 mph swing the ball will have a velocity of 150 mph. For maximum distance, the optimal launch angle is 11 to 13 degrees with a ball spin rate of 2500 to 2900 rpm. Using a launch monitor, experiments tabulate the loft for each club that provides the maximum distance for various swing speeds.

However, if the club head is moving in a steep downward path through the ball, so the velocity vector is pointing downward, for an optimal launch angle the club head loft should be increased by the difference in the angle of the velocity vector and the horizontal path. That is the club head is moving downward through impact so the loft angle should be increased to produce the optimal launch angle. Conversely, if the club head is moving upward through impact the loft should be decreased. The calculation of angle through impact is discussed in the following section. In a preferred embodiment to fit the loft of the club, we combine a table look up of the optimal loft for a horizontal swing and a particular swing speed with a correction derived from the angle of approach through the ball, that is, the deviation from the horizontal swing path.

Finally, if the golfer consistently hooks or slices the golf ball there is an opportunity to at least partially correct the error through a custom fitted golf club. A person who slices the ball has the club head open at impact, whereas a golfer who hooks the ball has the club head closed at impact. The open or closed clubface can be calculated accurately from the roll angle of the mobile device 10 at impact, see FIG. 5. These data can then be used to select the optimal open or closed angle of the club head, and the weighting for a club head: a weighting with a club head center of mass closer to the shaft will encourage more angular rotation, correcting a slice, and a weighting farther from the shaft will reduce the angular rotation, correcting a hook. Again, these data are compiled by vendors and are incorporated into product tables.

In an embodiment, the rules engine 140 custom fits a golf club in a four step process given user and motion sensor input: (1) Club head selection; (2) shaft selection; (3) grip selection; and (4) iterative optimization with user input. In order to clarify the club component selection process we illustrate an example for three different users A, B and C custom fitting of a golf driver as follows, see FIG. 12.

User A is a 73 year old male, is left handed, has a 12 handicap, is not price sensitive, and has a preference for PING golf clubs. The mobile device calculated club head speed for Player A is 82 mph, with an average "straight" at impact, zero difference in lie angle, and zero difference in velocity vector direction from calibration point to impact point.

As a first step user A inputs his existing club specifications, the "base-case": A PING G15 driver with 9.5 degrees loft, and a stiff shaft with a mid flex point and standard PING grip. The player A next takes swings of his mobile device and the display on the mobile device 10 and/or web-enabled display 200 are ball flights for the base-case club given the swing speed, and other variables.

The virtual club fitting lab 100 then presents user A custom club head recommendations by filtering the data base for PING left handed club heads with zero lie angle adjustment and neutral weighting (no hook or slice): the PING Anser driver head with a 12.7 degree loft would be a primary recommendation. Shaft recommendations are then given: the rule for a 82 mph swing speed, mid handicap player, will be for a lighter shaft senior (softer) stiffness and a low flex point. Hence the recommendation would be to filter available PING shafts for a recommendation: a PING TFC 800D 50 gram shaft, Senior stiffness, and low flex point. Finally standard thickness grips are presented, which are selected predominantly based upon demographic and handicap data, and upon the user A preferences, by filtering the grips in the component database. The relatively high loft angle, lighter shaft and low kick point will maximize the ball flight for user A. Total cost: approximately $400.

The rules engine 140 iterates between possible outcomes when multiple components are possible, goal seeking for the optimal ball flight distance. The completely assembled golf club(s) is/are displayed on the mobile device 10 and/or the display device 200. As the final step the user A swings the mobile device and the ball flight of the customized virtual club is displayed in comparison to the original base-case club simulated ball flight data. The user then has the option to iterate between club components and compare virtual simulated ball flights before making a selection. Marketing messaging and golf store mapping, see FIG. 11, or links to online purchase options, are presented on the mobile device 10 and/or web enabled display device. User A can see the difference in virtual ball flight, approximately 10 to 15 yards, compared to the base case.

User B is a 35 year old male, right handed, 25 handicap player with price sensitivity of less than $250. His swing speed is measured by the mobile device to be 92 miles per hour with an average 6 degree slice and a 3 degree positive lie angle difference. The process is the same as for user A, the rules engine filters club heads, shafts and grips including constraints and iterates resulting in the following recommendation: Callaway RAZR Hawk Draw Driver with 11 degree loft, flat lie angle, 4 degree closed head, with a regular stiffness 60 gram shaft and mid flex point, and standard grip—total cost approximately $200. This custom club is lighter, will partially correct the slice, and will increase the ball flight distance by approx. 5 to 8 yards. User B then has the opportunity to test drive the virtual club and simulate the different ball flight, and will be presented with marketing messaging on where to purchase with promotional offers, online or at a physical store.

Finally User C is an expert 27 year old golfer with a 2 handicap and no price sensitivity. His swing speed is measured by the mobile device to be 110 miles per hour with an average 3 degree draw and zero lie angle difference, and 3 degree downward impact point velocity vector angle relative to the calibration point vector. The process is the same as for user A and user C: the rules engine filters club heads, shafts and grips including constraints and iterates. The recommendation is as follows: TaylorMade RBZ Driver head with 9 degree loft, flat lie angle, 1 degree open head, with a stiff 70 gram Graffaloy X shaft with a high flex point, and tour grip—total cost approximately $900. This golf club will maximize ball flight distance and accuracy for user C.

Note that in all three case examples the user input data, demographic data, and the swing analysis data was different. The process however is the same, as each major component is selected the data base of product components is filtered down and iteratively converging on the optimal golf club which maximizes the desired ball flight with constraints.

This example is meant to be illustrative and not limiting. The component model numbers are expected to change over time and additional variables to those illustrated may be used by the rules engine to recommend customized golf clubs.

While the method was illustrated for the case of a driver, it is understood that the same method is applicable to selection of multiple clubs, such as irons or wedges. Furthermore, the example illustrated had three different users. The number of users is not limited and may be singular if the club fitting lab system 100 is installed locally on a particular user's mobile device, see FIG. 9. In the cloud-based embodiment, see FIG. 11, the system 100 is scalable to millions of concurrent users, each with a simultaneous plurality of custom club fitted recommendations.

As mentioned, the virtual fitting can be conducted with the mobile device 10 either held in the user's hand or attached to a golf club. The methods are substantially similar; however, the speed multipliers are different since a golf club with the mobile device 10 is heavier than just the mobile device 10. Hitting an actual ball gives confidence to the accuracy of the system, as users can see the actual ball flight. However, using the mobile device 10 alone is surprisingly accurate, and from our experiments, the simulated ball flight matches closely.

Referring again to FIG. 8, an exemplary mobile device holder 20 is shown. Deficiencies of prior art mobile device holders include (1) the holder is open at the top so the mobile device can fall out during a full golf swing and (2) the holder is not easily attached/detached from the golf club. The mobile device holder 20 overcomes these shortcomings and is comprised of an injection molded mobile device case that completely encloses the sides of the mobile device 10 and a small collar that is mounted to the golf club shaft. An important advantage of this design is that the collar can be kept on the golf club, and the mobile device case kept permanently on the mobile device 10. The mobile device 10 can also be quickly attached/detached to various different golf clubs if they have collars installed.

In an embodiment, the virtual golf club fitting lab application can be loaded entirely onto the mobile device 10, with the rules engine 140 (comprising computer code) and the product component database 120 (comprising data) downloaded onto the mobile device 10. In other embodiments, the software of the invention can be run in a distributed application with the rules engine 120 and product component database 140 in the cloud. The cloud-based architecture has the advantage that the product component database 140 and the rules engine 120 can be updated independently of the mobile device application, so that as new product components are introduced, the user does not have to upgrade software on the mobile device 10.

Golf Swing Motion Analysis

An important element of the present invention is the motion analyzer that uses the accelerometer and gyroscope integral to the mobile device 10. A particular challenge that the present invention overcomes, is how to accurately analyze a swing without actually hitting a golf ball or holding a golf club.

The first challenge with analyzing golf swing data from a mobile device 10 is finding ball "impact" so that data around impact can be compared to other parts of the swing. An important component of the present invention is that we define "zero" at the start of the swing. Specifically for the virtual golf club fitting lab 100, the user first swipes the screen of the mobile device 10 which tells the app the user is getting ready to swing. The user then holds the mobile device 10 in the address position as if to hit an imaginary ball. When the mobile device 10 is held stationary for a predetermined length of time (e.g., one second) it vibrates and/or emits an audible indicator. This signal is the "zero" of the golf swing, and the changes in the accelerometer and gyroscope sensors are relative to this "zero".

Pitch data, or the rotation around the axis that cuts the mobile device into top and bottom halves when looking at the screen (X-axis) is the most telling data stream as a golfer moves through their swing, see FIG. 5. Impact is found at the first major minimum that approaches our starting calibration (we define zero by taking the average of all mobile device position/orientation data over the course of one second taken prior to the swing when the golfer is in their set-up position). To bring context, in a golfer's swing, pitch data rises as the golfer goes into their backswing, returns to calibration as he or she swing through impact, then rises again as he or she moves into their follow through. Impact is the pitch position that gets closest to our set-up. This minimum is confirmed by aligning it with a spike in Z-acceleration or a maximum in change in yaw; this is in the event that more than one major minimum in pitch is found, the minimum selected as impact is determined by which point has the greatest Z-acceleration. This confirmation helps in cases where a golfer's backswing or follow-through rotation is so great (near 360 degree rotation from set-up) that the gyroscope flips completely and creates extra minimums near calibration.

Once impact is found, swing accuracy is determined by subtracting roll data at impact from roll data at calibration, see FIG. 7. Roll data, or the rotation around the axis that cuts the mobile device into left and right halves when looking at the screen (Y-axis) describes "open and closed" face positions on the club head. Swings that return a negative difference mean that the user over-rotated at impact, this implies a closed face at impact and a resulting draw or hook depending on the amount. Swings that return a positive difference mean that the user under-rotated at impact, this implies an open face at impact and a resulting fade or slice. Swings that return a near zero value mean the club face very closely matched calibration orientation at impact and imply a straight ball flight.

Speed is approximated by analyzing pitch data, see FIG. 5. Once we have found impact in pitch data we can look forward and back in pitch data by 45 degrees. These data points, assuming proper wrist hinging, align with positions in the swing. So if impact happens at pitch=−65 degrees, we can look at pitch=−25 degrees before and after impact (45 degrees in each direction) and find how much time elapsed between each point. Generally, about one tenth of a second passes between these two positions, so given arm length we can find mobile device speed around impact by dividing a 90 degree arc length where the radius=user arm length by time passed: This delivers device/hand speed.

We have found, using high speed video clocking, that the driver club head speed can be as slow as 2.4 times handspeed (this is in the case of a user swinging a club with rigid arms, forearms, and wrists) or as fast as 6 times hand speed (in the case of a world class professional golfer). The difference between these two multipliers comes from the combination of forearm rotation and wrist hinge which allow golfers to force the club head to travel through a much greater arclength (sometimes even close to 180 degrees) in the time it takes the hands to travel through the 90 degrees of arclength around impact. The multiplier we choose is driven directly by gyroscope acceleration through impact on the Z and Y axis (yaw and roll) which account for wrist hinge and forearm rotation respectively.

From our detailed experiments with the Apple iPhone 4 and 4s, we found that the gyroscope is particularly accurate, so that the roll data is very good to predict hook or slice within approximately half a degree. The accelerometer data from the iPhone 4 however is noisy and is not particularly accurate over the entire golf swing, but does work well for measuring forearm rotation rate around impact. This is why we divide the swing into portions and calculate an average velocity, V, of the mobile device through impact through the last portion of the swing prior to ball "impact":

$$V = \frac{D_2 - D_1}{t_2 - t_1} \quad (1)$$

where $D_2-D_1$ is the distance of the last portion of the golf swing before ball impact; and $t_2-t_1$ is the time taken to cover the distance $D_2-D_1$.

This is an approximation of the actual instantaneous velocity of the mobile device, and is only a first order approximation of the speed of the golf club head, since it does not include the wrist hinge or forearm rotation described above. Via detailed experiments with a high-speed video camera we were able to find multipliers for these variables, with the result of calculating club head speed within +/-10% for a variety of swing types. From club head speed we can predict ball flight distance in ideal conditions.

We envision that the data quality output from the accelerometer will improve dramatically in future versions of iPhone or Android based mobile devices. When this technology becomes available we will more accurately calculate the velocity of the mobile device at impact by integrating the acceleration from the top of the backswing ($t_{bs}$) to the zero ($t_0$) of the mobile device:

$$V_x = \int_{t_{bs}}^{t_0} a_x dx$$

$$V_y = \int_{t_{bs}}^{t_0} a_y dy$$

$$V_z = \int_{t_{bs}}^{t_0} a_z dz \quad (2)$$

with the total mobile device velocity at impact:

$$V = \sqrt{V_x^2 + V_y^2 + V_z^2} \quad (3)$$

Where $t_0-t_{bs}$ is the time between the minimal at the top of the back swing ($t_{bs}$) measured from the pitch data and the zero at the bottom of the swing at impact, $t_0$. The integrals are calculating in the software using a fourth order Runge-Kutta algorithm. See for example, William H. Press et al, Numerical Recipes 3rd Edition: The Art of Scientific Computing, 2007.

The velocity component vectors (2) are difficult to accurately calculate with the current version of the accelerometers, since the internal accelerometer has a noisy output. Hence, for club fitting, we average at least 20 swings to obtain these values, and also employ a software-based high-pass filter, see for example William H. Press et al, Numerical Recipes 3rd Edition: The Art of Scientific Computing, 2007. With the current technology and our method we are able to calculate the velocity vector magnitudes and directions at the takeaway from the calibration point and in the region of the impact point, which enables the loft fitting discussed above, see FIG. 4.

The user can also attach the mobile device to their golf club via a cradle and compare actual practice swings to the computed swings for distance and accuracy. We use a similar analysis when the mobile device is attached to the club, but the multipliers are different primarily due to users swinging the golf club slower than the mobile device: the mobile device is lighter than a golf club so ones hands naturally go faster.

As an additional example of swing analysis we consider putting, rather than the full swing of a golf club. PING has previously created an iPhone App for putting. Their prior art has three significant limitations however: (1) they requires an attachment to a putter, (2) they require impact with a physical ball, and (3) their method is not accurate for long puts, greater than approximately 20 feet.

Our method does not have any of these limitations. Similar to the full swing described above, the user holds the mobile device as if it were a putter, and after one second of being held still it vibrates: the mobile device is ready. The user then puts an imaginary ball. Compared to the full swing, the pitch data from the mobile device is now a relatively smooth sine wave function with a minimum at impact. The putter stroke is analyzed similar to the full golf swing, but with average velocity calculated from Eq. 1 where $D_1$ and $D_2$ are the respective maximum distances pull back and stroke through impact with the ball. An advantage of the putter stroke is that the function is smooth and the speed is relatively slow compared to the full golf swing. Hence, equations (2) and (3) can also be used to calculate an instantaneous velocity at impact—we use both methods, integration of equations (2) and average velocity from Eq. (1), with a scale multiplier for the length of the putter for speed at the putter head at impact with a ball. For long puts the acceleration method becomes increasingly inaccurate, hence the average velocity method provides better results with a multiplier derived from empirical measurements.

From the speed of the putter head the distance the ball travels can be calculated assuming ideal conditions. Most important, however, is that we are able to quantify mobile device roll angle differences at impact (similar to hook or slice for the full swing). We can also analyze the gyroscope acceleration data for errors such as deceleration through the put, or a left pull or right push (these last two errors are identified from the combination of the second integral of acceleration, and the roll data). Customized club fitting is then delivered based upon the putting motion analysis. Data on swing motion accuracy is also presented to the user and stored, local to the app and on the server in the users account, for longitudinal comparisons of putting consistency improvement. For greater detail, see, U.S. application Ser. No. 13/655,366 to Jeffery et al., entitled METHOD AND SYSTEM TO ANALYZE SPORTS MOTIONS USING MOTION SENSORS OF A MOBILE DEVICE.

Analytic Marketing

One preferred embodiment of the invention provides targeted marketing based upon the swing analyzer data. That is, the user is presented with a display advertisement of a specific golf manufacturer's product that they can touch to get detailed product information. Marketing messages can be displayed on the mobile device 10 or on a device different from the mobile device (e.g., a web-enabled device 200 networked to the cloud-based server 110). Testimonials of the expert golf instructors can further enhance the impact of the advertising, and increase the take rate of users (the percent of users who accept the offer).

A particular feature of the invention is to combine custom club fitting recommendations with location awareness, so that specific golf stores and/or club fitting facilities are highlighted on a map in the local area, with the component availability. This can be accomplished using global positioning sensor data to provide nearest golf store location information, either displayed on the user's mobile device 10 or a separate web-enabled device linked to the cloud-based server 110, for example. We also provide a web-based solution, so that the user can immediately purchase the custom golf club via the Internet.

Golf club fitting is an ideal opportunity for cross-sell and up-sell of high value golf equipment. See, for reference, Mark Jeffery, Data-Driven Marketing: The 15 Metrics Everyone in Marketing Should Know, Wiley 2010. For example, a customer selecting a driver is also an ideal candidate to also buy a three wood, or a customer purchasing a custom putter is ideal to target marketing to also buy wedges to enhance their short game, and both customers may need a new golf bag, clothes and golf balls. Bundling of products is known to result in significantly increased wallet share and higher margins. See FIG. 9 for an exemplary screenshot of the mobile device displaying these combined elements: (1) the custom fitted golf club, (2) mapped location of the nearest store with the product, and (3) bundling of related products with a marketing offer for purchase of the bundle.

In a preferred embodiment, the analytic marketing component is enabled by augmenting the product component database with retail store names and locations, on-line channel options, and inventory data. The analytic rules engine then also includes business logic to target marketing depending upon the golf club that is being fitted, the global positioning sensor data output, and other data that is known about the user. The distributed system is an extension of the architecture described in co-pending U.S. patent application Ser. No. 13/269,534, filed Oct. 7, 2011, and entitled "METHOD AND SYSTEM FOR DYNAMIC ASSEMBLY OF MULTIMEDIA PRESENTATION THREADS", and in U.S. application Ser. No. 13/659,774 to Jeffery et al., entitled METHOD TO PROVIDE DYNAMIC CUSTOMIZED SPORTS INSTRUCTION RESPONSIVE TO MOTION OF A MOBILE DEVICE, filed Oct. 24, 2012.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method, comprising:
   holding a mobile device directly in at least one hand of a user, the mobile device having motion sensors therein;
   swinging the hand-held mobile device having motion sensors integrated therein to simulate a golf swing;
   evaluating the simulated golf swing to determine at least one characteristic of a component of a custom-fitted golf club; and
   outputting information related to the determined at least one characteristic;
   wherein evaluating the simulated golf swing includes determining a virtual impact point of a virtual ball, the virtual impact point found at a minimum of pitch confirmed by a maximum of yaw, the pitch and yaw obtained using the motion sensors.

2. The method of claim 1, wherein the motion sensors include a gyroscope and an accelerometer.

3. The method of claim 1, further including the steps of:
   holding the mobile device in an initial position; and
   emitting a human-perceptible signal indicating readiness to start the swinging.

4. The method of claim 1, wherein the step of evaluating the golf swing includes estimating a velocity of the mobile device at the virtual impact point.

5. The method of claim 4, wherein the velocity is one of an average velocity and an instantaneous velocity.

6. The method of claim 4, wherein the at least one characteristic includes golf club shaft stiffness determined at least in part using the estimated velocity of the mobile device.

7. The method of claim 4, wherein the at least one characteristic includes golf club shaft weight determined at least in part using the estimated velocity of the mobile device.

8. The method of claim 4, wherein the at least one characteristic includes golf club shaft flex point determined at least in part using the estimated velocity of the mobile device.

9. The method of claim 1, wherein the at least one characteristic includes a golf club head lie angle determined at least in part using gyroscope data.

10. The method of claim 1, wherein the at least one characteristic includes a golf club head loft angle determined at least in part using an angle of approach of the mobile device through impact.

11. The method of claim 1, wherein the at least one characteristic includes a golf club head angle relative to the shaft determined at least in part using gyroscope data.

12. The method of claim 1, the at least one characteristic includes a golf club head weighting determined at least in part using gyroscope data.

13. The method of claim 1, wherein the outputting step further includes displaying on the mobile device information related to a selected custom golf club.

14. The method of claim 1, wherein the outputting step further includes displaying on another display device separate from the mobile device information related to a selected custom golf club.

15. The method of claim 1, further including displaying a ball flight simulation.

16. The method of claim 15, wherein the displayed ball flight simulation is displayed on a second device and the mobile device, the second device and the mobile device networked.

17. The method of claim 1, wherein the outputting step includes displaying a video clip of a virtual guide.

18. The method of claim 17 wherein the video clip is presented on a display device different from the mobile device.

19. The method of claim 1, wherein the outputting step includes displaying ball flight distance information for at least one custom-fit golf club.

20. The method of claim 19, wherein ball flight distance information for several different custom-fit golf clubs are displayed on the mobile device at the same time.

21. The method of claim 1, wherein the outputting step includes displaying swing data for at least one custom-fit golf club on the mobile device.

22. The method of claim 1, wherein the outputting step includes displaying swing data for at least one custom-fit golf club on a display device different from the mobile device.

23. The method of claim 1, wherein the output step includes outputting at least one marketing message on the mobile device.

24. The method of claim 23, wherein the at least one marketing message is outputted on a device different from the mobile device.

25. The method of claim 23 where the marketing message includes a testimonial.

26. The method of claim 1, further including the step of using global positioning sensor data to provide golf store location information.

27. The method of claim 26, wherein the global positioning sensor data is used to provide golf store location information on a device different from the mobile device.

28. The method of claim 1, wherein the method is performed using only the mobile device, the evaluating and outputting steps performed on the processor of the mobile device.

29. A non-transitory computer-readable medium which stores a set of instructions which when executed performs the evaluating and outputting steps of the method of claim 1.

30. The non-transitory computer-readable medium of claim 29, wherein the set of instructions is stored in memory of mobile device.

31. An apparatus comprising a mobile device having motion sensors integrated therein, the apparatus including a non-transitory computer-readable medium which stores a set of instructions which when executed by a processor of the mobile device performs the evaluating and outputting steps of claim 1.

32. A system, comprising:
a server;
a product component database linked to the server; and
a plurality of mobile devices linked to the server, each of the mobile devices having motion sensors integrated therein;
wherein, when one of the mobile devices is held in a hand and then moved to simulate a golf swing, the system is configured to:
evaluate the simulated golf swing to determine at least one component of a custom-fitted golf club, the at least one component selected from the product component database; and
output information related to the determined at least one component;
wherein the simulated golf swing is evaluated including to determine a virtual impact point of a virtual ball, the virtual impact point found at a minimum of pitch confirmed by a maximum of yaw, the pitch and yaw obtained from the motion sensors.

33. The system of claim 32, wherein a plurality of the mobile devices are linked to the server concurrently.

34. The system of claim 32, wherein the output information is displayed on the same mobile device used to simulate the golf swing.

35. The system of claim 32, wherein the output information is displayed on a display device different from the mobile device used to simulate the golf swing.

36. The system of claim 35, wherein the output displayed on a web-enabled display device includes a ball flight simulation.

37. The system of claim 32, wherein the output information includes one or more of a testimonial, a product recommendation, and a marketing message.

38. The system of claim 32, wherein the mobile devices are linked to the server via the Internet.

39. The system of claim 32, wherein the motion sensors include a gyroscope and an accelerometer.

40. The system of claim 32, wherein, preparatory to the mobile device being moved to simulate the golf swing, the mobile device is held in an initial position until a human-perceptible signal indicating readiness to start the swinging is emitted.

41. The system of claim 32, further comprising a database for storing motion data related to motions of the mobile device during the golf swing.

42. The system of claim 32, wherein the at least one component of the custom-fitted golf club is selected according to a set of predetermined rules based at least in part on one or more of user input data, prior golf swing motion data, and CRM data.

43. The system of claim 32, wherein evaluation of the customized club fitting includes comparison of a not-fitted golf club component and a custom-fitted golf club component for measuring performance improvement.

* * * * *